US007012976B1

(12) United States Patent
Tortelier et al.

(10) Patent No.: US 7,012,976 B1
(45) Date of Patent: Mar. 14, 2006

(54) METHOD FOR DECODING AND OF JOINT EQUALIZATION OF A DIGITAL SIGNAL PROTECTED BY A CODE DEFINED BY A TRELLIS

(75) Inventors: Patrick Tortelier, Clichy (FR); Raphaël Visoz, Iissy-les-Moulineaux (FR)

(73) Assignee: France Telecom, Paris (FR)

( * ) Notice: Subject to any disclaimer, the term of this patent is extended or adjusted under 35 U.S.C. 154(b) by 780 days.

(21) Appl. No.: 10/070,854

(22) PCT Filed: Sep. 8, 2000

(86) PCT No.: PCT/FR00/02491

§ 371 (c)(1),
(2), (4) Date: Mar. 8, 2000

(87) PCT Pub. No.: WO01/20861

PCT Pub. Date: Mar. 22, 2001

(30) Foreign Application Priority Data

Sep. 13, 1999 (FR) .................................. 99 11411

(51) Int. Cl.
*H03D 27/06* (2006.01)
(52) U.S. Cl. ...................... 375/341; 375/262; 375/265; 714/792; 714/794; 714/796
(58) Field of Classification Search ............... 375/341, 375/229, 324, 365, 240.27, 262, 265; 714/796, 714/792, 794
See application file for complete search history.

(56) References Cited

U.S. PATENT DOCUMENTS 5,265,105 A * 11/1993 Iwane ........................ 375/365

5,432,808 A * 7/1995 Hatano et al. ................ 372/45
6,426,972 B1 * 7/2002 Endres et al. ................ 375/229

FOREIGN PATENT DOCUMENTS

EP 0 758 167 2/1987

(Continued)

OTHER PUBLICATIONS

Joint equalization and decoding of trellis-encoded signals using the generalized Viterbi algorithm, Tortelier etal., Technology Conference, 2000 IEEE VTS-Fall VTC 2000, 52nd vol. 3, Sep. 24-28, 2000 Page(s):1221-1225, vol. 3.*

(Continued)

*Primary Examiner*—Stephen Chin
*Assistant Examiner*—Ted M. Wang
(74) *Attorney, Agent, or Firm*—Gardner Carton & Douglas LLP

(57) ABSTRACT

The invention concerns a method for jointly decoding and equalizing a digital signal protected by a trellis-defined code and transmitted though a channel. The method consists in carrying out a maximum likelihood estimate of each current bit $x_n$ by minimizing the quadratic error between the observed symbol $V_n$ and the current symbol in the channel output $z_n$, the quadratic error being calculated (1002) from the set of observed symbols based on the branch metric of the last transition $e_{n1}(X) \rightarrow e_n(X)$ according to the relationship (I); wherein k represents the rank of the coefficients of transverse filtering introduced by the radioelectric channel. The branch metric is calculated by backtracking through the successive states and the error propagating process is inhibited (1003) while backtracking through the successive states by storing at each node S survivors and by updating each survivor at the next time. The final survivor of the least metric is determined (1004) and the sequence of bits is read by backtracking through the successive nodes. The invention is applicable to ATM radio transmission.

2 Claims, 8 Drawing Sheets

FOREIGN PATENT DOCUMENTS

EP   0 858 196   8/1998
EP   0 889 612   1/1999

OTHER PUBLICATIONS

Hashimoto, T. "A List-Type Reduced-Constraint Generalization of the Viterbi Algorithm". *IEEE Transactions on Information Theory*, U. S., IEEE, Inc., New York, NY, vol. 33, No. 6, Nov. 1987, pp. 866-876.

Duel-Hallen A., et al. "Delayed Decision-Feedback Sequence Estimation". *IEEE Transaction on Communications*, U. S., IEEE, Inc., New York, NY, vol. 37, No. 5, May 1989, pp. 428-436.

Chevillat, P., et al. "Decoding of Trellis-Encoded Signals in the Presence of Intersymbol Interference and Noise". *IEEE Transactions on Communications*, U. S., IEEE, Inc., New York, NY, vol. 37, No. 7, Jul. 1989, pp. 669-676.

Eyuboglu, M. Vedat, et al. "Reduced-State Sequence Estimation for Coded Modulation on Intersymbol Interference Channels". *IEEE Journal on Selected Areas In Communications*, U. S., New York, NY, vol. 7, No. 6, Aug. 1989, pp. 989-995.

Kohno, et al. "An Automatic Equalizer Including A Viterbi Decoder for Trellis-Coded Modulation System". *International Conference on Acoustics. Speech & Signal Processing, ICASSP*, U. S., New York, NY, IEEE, Inc., vol. 14, 1989, pp. 1368-1371.

International Search Report issued by the European Patent Office for International Application No. PCT/FR00/02491, report dated Oct. 25, 2000.

\* cited by examiner

METHOD FOR DECODING AND OF JOINT EQUALIZATION OF A DIGITAL SIGNAL PROTECTED BY A CODE DEFINED BY A TRELLIS

FIELD OF INVENTION

The invention relates to a method of decoding and of joint equalization of a digital signal protected by a code defined by a trellis.

BACKGROUND OF THE INVENTION

With the recent advent and development of the exchange of information by way of digital messages, reliable and high-performance transmission of digital data has become the economic stake.

Among the transmission modes used, digital packet transmission occupies a pre-eminent place, by reason of the flexibility and of the reliability of the protocols for transmission of these data.

However, the development of transmissions at very high throughput on radio frequency channels, featuring characteristics of frequency selectivity which are variable over time, makes it necessary to submit the digital data constituting these messages and the medium for this information, to a process of protection by specific coding. These protection processes are for the purpose of introducing into the digital data a certain amount of redundancy, which, in the presence of degradation of these data due to the transmission, makes it possible, under certain conditions, to reconstitute the original signal. By way of non–Limiting example, mention may be made of the protection of digital data by a convolutional code of efficiency R=k/n where the efficiency k/n is representative of the redundancy introduced, and the ATM (Asynchronous Transmission Mode) transmission on a radio link, with granularity at the level of the ATM cells. It will be recalled that the notion of granularity implies the possibility of transmission of each ATM cell in isolation, without interlacing of the cells.

By reason of the physical nature of the radio frequency channel, the transmission of digital data takes place in the presence of multiple propagation paths. The reception and the decoding of these messages consequently require equalization of the received signal. The complexity of the equalization processing operations increases very rapidly with the dispersion in the delays, and, likewise, with the throughput of the symbols transmitted. This is particularly the case in the urban environment, upon transmission of mobile-telephony messages and signals.

The protection introduced by coding of these digital data transmitted makes it possible partially to remedy the errors introduced. However, the equalization made necessary by interference on the symbols, due to the multiple paths, is never perfect and it is then necessary, as far as possible, to disperse the error bursts at the output of the equalizer, so that the channel decoder can function on a signal with a substantially constant, further reduced error density.

Such a method of operating can be obtained by a process of interlacing of the coded data, which prevents the notion of granularity, and which, moreover, introduces a delay which it is necessarily sought to minimize, which, a priori, appears contradictory.

Furthermore, for high throughput, the size of the interlacing becomes prohibitive.

Moreover, the presence of a channel decoder downstream of the equalization device, the equalizing/decoding sequencing being made necessary by the coding/transmission/multiple-path sequencing on transmission, encourages the use of an equalization process giving flexible equalized symbols, that is to say symbols the firm value of which is accompanied by a likelihood probability value, which further increases the complexity of the equalization and of the overall processing.

SUMMARY OF THE INVENTION

The object of the present invention is to remedy the drawbacks of the methods of the prior art set out above.

One object of the present invention, consequently, is the implementation of a method making it possible jointly to carry out the operations of equalization and of channel decoding directly on the trellis of the channel decoder, a trellis the complexity of which is fixed and independent of the length of the pulse response of the channel.

Another object of the present invention is the implementation of a method making it possible jointly to carry out the operations of equalization and of channel decoding for digital data transmitted in packet form, the pulse response of the channel being assumed to be constant during the transmission of a packet.

Another object of the present invention is the implementation of a method making it possible jointly to carry out the operations of equalization and of channel decoding for digital data transmitted in packets, in the absence of interlacing over several packets, this operating mode being particularly suitable for high-throughput transmission systems which have to provide granularity at the packet level, such as the ATM systems on a radio link.

Another object of the present invention is the implementation of a method making it possible jointly to carry out the operations of equalization and of channel decoding, dispensing with the necessity for flexible output equalization, because of the joint nature of the equalization and channel-decoding operations.

Another object of the present invention is the implementation of a method making it possible jointly to carry out the operations of equalization and of channel decoding particularly adapted to the processing of a modulation with a large number of states, which makes it possible to get round the significant increase in the complexity of a process in the sense of the maximum likelihood of conventional type.

Another object of the present invention is, finally, the implementation of a method making it possible jointly to carry out the operations of equalization and of channel decoding, making it possible to avoid the phenomenon of error propagation during the decoding, by implementing an adapted version of the Viterbi algorithm.

The method of joint decoding and of equalization of a digital signal protected by a code defined by a trellis, which is the subject of the present invention, applies to a signal transmitted with non-interleaved packets. Each packet includes a known sequence and a sequence of coded data, each sequence of bits $x=\{x_n\}$, from current bit $x_n$, subjected to the coding process defined by a trellis and to a modulation process, having a corresponding sequence of symbols $y=\{y_n\}$, from current symbol $y_n$, satisfying the relationship $y_n=f(x_n; x_{n-1}; \ldots; x_{n-K})$. The sequence of bits prior to the current bit, $e_{n-1}(x)=\{x_{n-1}; x_{n-2}; \ldots; x_{n-K}\}$ represents the state of the coding process at the previous state n−1 and the current symbol $y_n$ of the sequence of symbols satisfies the relationship $y_n=f(x_n, e_{n-1}(x))$. This sequence of symbols is in fact submitted to a transverse filtering with finite impulse response, with filtering coefficients $\{h_0; h_1; \ldots; h_L\}$ representative of the radio frequency channel in order to generate a sequence of observed symbols $r=\{r_n\}$. Each observed symbol $r_n$ satisfies the relationship $r_n=z_n+b_n$ where $z_n$ designates a current symbol at the output of the channel and $b_n$ a residual noise affecting the channel. Each current symbol at the output of the current channel $z_n$ satisfies the relationship:

$$\begin{aligned} Z_n &= g(y_n; y_{n-1}; \ldots ; y_{n-L}) \\ &= h_0 y_n + h_1 y_{n-1} + \ldots + h_L y_{n-L} \\ &= \Phi(x_n; x_{n-1}; \ldots ; x_{n-L-K}). \end{aligned}$$

This method consists in estimating each current bit $x_n$ of the sequence of bits $x=\{x_n\}$ in the sense of the maximum likelihood by minimizing the quadratic error between observed symbol and current symbol at the channel output $$\varepsilon^2(x) = \sum_n |r_n - z_n|^2 = \sum_n |r_n - \phi(x_n; x_{n-1}; \ldots ; x_{n-L-K})|^2,$$

For any current symbol at the output of the channel $z_n$ arising from the transmission, because of multiple paths, the successive sequence of the symbols $\{y_{n-L}; y_{n-L+1}; y_{n-1}; y_n\}$ arising from the coding process for the sequence of bits $x=\{x_n\}$ corresponding to successive states $e_{n-L}(x); e_{n-L+1}(x); \ldots ; e_{n-1}(x)$ and finally $e_n(x)$, which define branches between successive state nodes, a succession of branches designating a path of a trellis representing this code, this method consists moreover in calculating the quadratic error on the basis of the set of observed symbols and of the successive state branches of the coding process, on the basis of the branch metric of the last transition $e_{n-1}(x) \to e_n(x)$ of the coding process, according to the relationship:

$$\varepsilon^2(x) = \sum_n \left| r_n - \left\{\sum_{k \geq 0} h_k y_{n-k}\right\} \right|^2 = \sum_n \left| r_n - h_n y_n - \left\{\sum_{k \geq 1} h_k y_{n-k}\right\} \right|^2$$

This branch metric is calculated by ascending the successive states at the level of each state node over a length equal to the memory of the channel, and in inhibiting, in the course of this ascent the process of error propagation because of the calculation of the branch metrics, by memory-storage at the level of each node i and at each instant of a number $S>1$ of survivors, each survivor being defined by an accumulated metric $M(i,t,k)$ for the node i at the instant t for the survivor of ranking k in question, $k \in [1, S]$, and by an updating of each survivor at the instant $t+1$ for each node by calculation of a branch metric and selection of the S best branch metrics from among the set of possible branch metrics at the node in question. The final survivor is determined as being the survivor with the smallest metric, $M_m(0, \tau, 1)$, and the corresponding sequence of information bits is read by ascending successive state nodes.

The method, the subject of the present invention, finds an application to any ATM transmission system over a radio link, with granularity.

BRIEF DESCRIPTION OF THE DRAWINGS

It will be better understood on reading the description and on perusing the drawings below, in which, in addition to FIG. 1 relating to the prior art.

FIGS. 3b and 3c represent an illustrative diagram of calculation of the S best metrics at each node of the trellis represented in FIG. 3a;

MORE DETAILED DESCRIPTION

Prior to the description proper of the method of joint decoding and of equalization of a digital signal protected by a code defined by a trellis, the subject of the present invention, reminders relating to the state of the art and to the current state of knowledge will be given below.

The systems for transmission of information, such as the recent mobile-radio systems with time-division multiple access, transmit their data in the form of packets of bits coded in advance. Within these packets of bits is inserted a sequence, known as training sequence, which makes it possible to obtain a good estimate of the channel, including the transmission and reception filters. The shape of the packets which are adopted in the context of the illustration of the implementation of the method, the subject of the present invention, is given below by reference to FIG. 1 relating to the prior art. The sequences of bits constituting training sequences may, for example, be Cazac sequences chosen for their auto-correlation properties.

The transmission channel thus introduces distortions on reception, these distortions being called inter-symbol interference. In the known solutions of the prior art, it is necessary to employ an equalizer so as to reduce or attempt to suppress the above-mentioned distortions. The functions of equalization and of decoding are separated in the above-mentioned devices of the prior art.

Figure 2A:
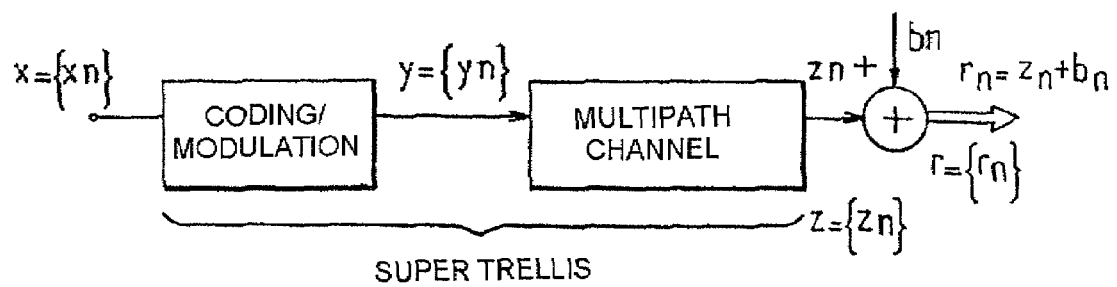
FIG. 2a represents a block diagram of a coding and transmission process making it possible to define the context of implementation of the method for joint decoding and equalization of a digital signal protected by a code defined by a trellis, in accordance with the subject of the present invention.

The context of generation of sequences of bits within the framework of the transmission process of the above-mentioned mobile-radio systems is illustrated now in connection with FIG. 2a.

Figure 1:
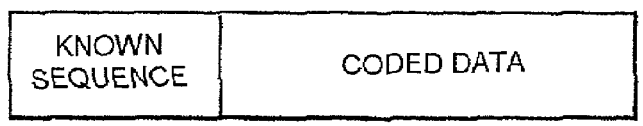

In a general way, it is indicated that the method, the subject of the present invention, applies to a digital signal as represented in FIG. 1, this digital signal being protected by a code defined by a trellis. It will be recalled, thus, that the notion of code defined by a trellis covers the methods of convolutional coding, coding of TCM type, and block coding, for example, in a non–Limiting way.

More specifically, the signal is transmitted on the radio frequency channel according to a transmission with non-interleaved packets, each of the packets corresponding to the data structure as represented in FIG. 1.

By reference to FIG. 2a, it is indicated that each sequence of bits $x=\{x_n\}$, from current bit $x_n$, is thus subjected to the coding process defined by a trellis and to a modulation process to which corresponds a sequence of symbols $y=\{y_n\}$, the current symbol being designated by $y_n$. Hence, each current symbol satisfies the relationship:

$$y_n = f(x_n; x_{n-1}; \ldots; x_{n-K}).$$

In the foregoing relationship, it is indicated that f designates a coding function of depth K taking account of the modulation process.

The sequence of bits prior to the current bit $x_n$, a sequence of bits designated by $e_{n-1}(x)$, satisfies the relationship:

$$e_{n-1}(x) = \{x_{n-1}; x_{n-2}; \ldots; x_{n-K}\}$$

and represents the state of the coding process at the previous state n−1. The current symbol $y_n$ of the sequence of symbols then satisfies relationship (1):

$$y_n = f(x_n, e_{n-1}(x)) \quad (1)$$

By reason of the presence of a multipath transmission channel, the sequence of symbols y is in fact subjected to a process equivalent to a transverse filtering with finite impulse response for which the filtering coefficients can be defined by $\{h_0; h_1; \ldots; h_L\}$. These filtering coefficients are representative of the radio frequency transmission channel.

As represented in FIG. 2a, the succession of the operation of coding/modulation then of transmission via the multipath channel makes it possible to generate a sequence of observed symbols denoted $r=\{r_n\}$, each observed symbol in fact corresponding to a current symbol at the channel output, denoted $z_n$, to which a residual noise $b_n$ is added, this residual noise affecting each of the current symbols at the above-mentioned channel output. The residual noise is centered Gaussian white noise.

Thus, each observed symbol rn satisfies the relationship:

$$R_n = z_n + b_n$$

Each current symbol at the channel output satisfies relationship (2):

$$Z_n = g(y_n; y_{n-1}; \ldots; y_{n-L}) \quad (2)$$
$$= h_0 y_n + h_1 y_{n-1} + \ldots + h_L y_{n-L}$$
$$= \Phi(x_n; x_{n-1}; \ldots; x_{n-L-K}).$$

According to one noteworthy aspect of the method, the subject of the present invention, by reference to FIG. 2a, it is indicated that the process of coding/modulation and the process of transmission via the multipath channel are likened to a cascading of an external code and of an internal code, the internal-code function being fulfilled by the multipath transmission channel. Thus, the internal and external codes consist respectively of a memory device which it is possible to represent by a trellis. To the combination of channel coder+transmission channel, there corresponds a "global" trellis, called super-trellis, the number of states of which is equal to the product of the number of states of the two individual trellises, that is to say a number of states equal to $2^{L+K}$ for BPSK modulation and an efficiency code 1/n. The method which is the subject of the present invention is noteworthy in that it uses only the trellis of the channel coder, the number of states of which is independent of the number of states of the modulation and of the length L of the channel.

Although the complexity of the trellis of the internal code, that is to say of the trellis generated by the multipath channel, grows exponentially with the number of states of the modulation and the length of the channel in terms of symbol time, the simple decoding of the super-trellis thus constituted is made prohibitive in terms of complexity for transmissions at high throughput.

In the simplest solutions, the reduction of the super-trellis is brought down to only the external coding trellis, the branch metric then being calculated in the manner of a DFSE process, standing for Decision Feedback Sequence Estimation, by ascending nodes of the trellis thus simplified. However, such a process does not appear to be sufficiently effective since it presents the drawback of an error-propagation phenomenon upon ascending successive nodes, errors inherent in the above-mentioned DFSE process.

The object of the method, the subject of the present invention, is to remedy the drawbacks of the above-mentioned prior art by the determination of the optimal reception on the basis of the super-trellis and by the implementation of a generalized Viterbi decoding technique, more widely designated by GVA decoding, standing for Generalized Viterbi Algorithm.

For a more detailed description of this GVA decoding process, reference may usefully be made to the article published by T. HASHIMOTO, entitled A List-Type Reduced-Constraint Generalization of the Viterbi Algorithm, IEEE Transactions on Information Theory, Vol. IT-33, No. 6, November 1987.

Thus, in accordance with one particularly noteworthy aspect of the method, the subject of the present invention, it consists in estimating each current bit $x_n$ of the sequence of bits $x=\{x_n\}$ in the sense of the maximum likelihood by minimizing the quadratic error between observed symbol and current symbol at the output of the channel $z_n$.

Figure 2B:
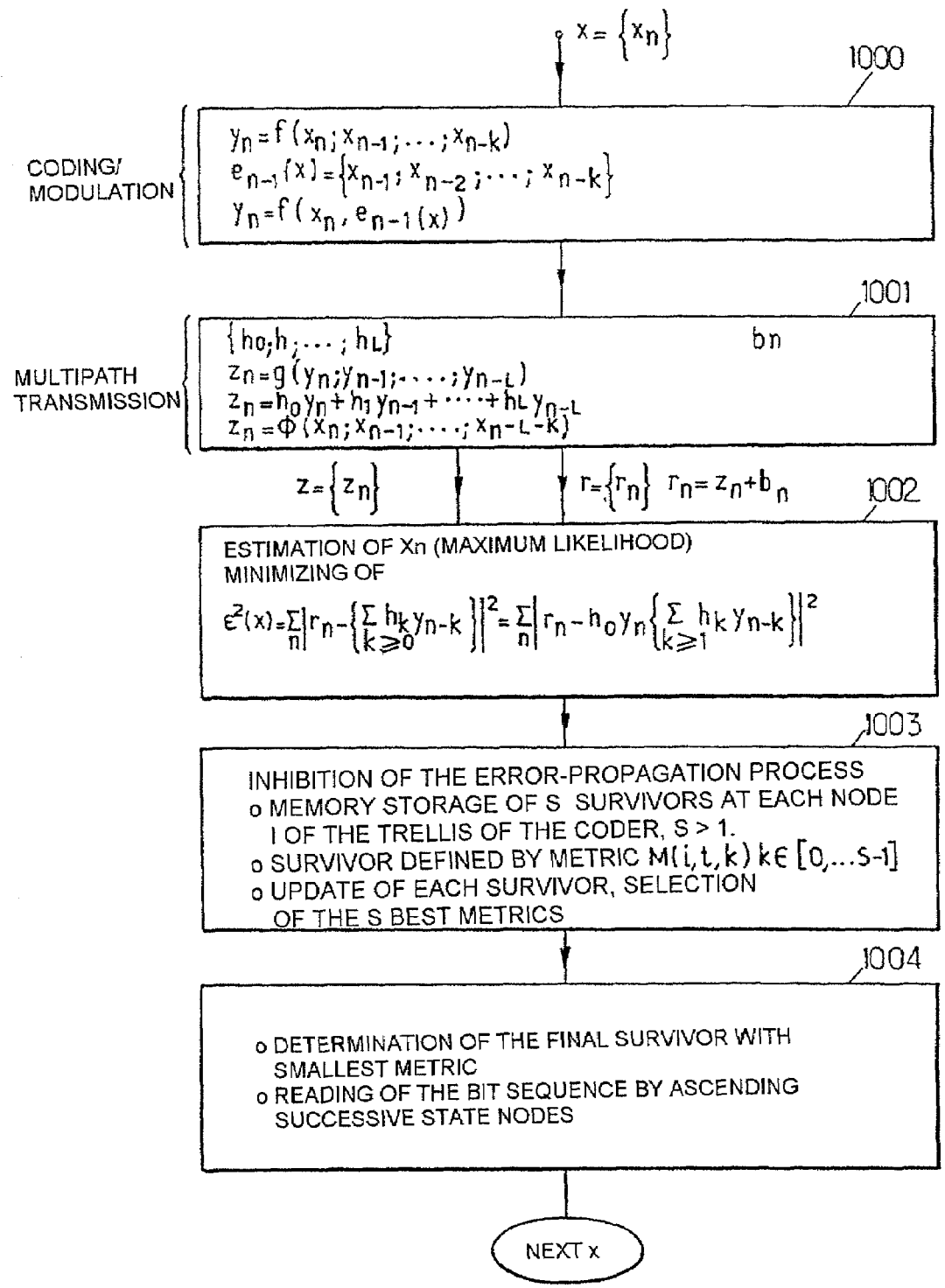
FIG. 2b represents, by way of illustrative example, a flow chart representative of the method of joint coding and equalization of a digital signal protected by a code defined by a trellis, in accordance with the subject of the present invention.

In FIG. 2b, in order to enhance the understanding of the implementation of the method, the subject of the present invention, the coding stage has been represented at stage 1000 on the basis of the sequence of bits x, followed by a stage 1001 corresponding to the multipath transmission so as to generate the sequence of observed symbols $r=\{r_n\}$ and the series of current symbols at the output of the channel $z=\{z_n\}$.

Stage 1001 is then followed by a stage 1002 making it possible to initiate the estimating of $x_n$ by minimizing the quadratic error satisfying the relationship:

$$\varepsilon^2(x) = \sum_n |r_n - z_n|^2 = \sum_n |r_n - \phi(x_n; x_{n-1}; \ldots; x_{n-L-K})|^2.$$

Figure 3A:
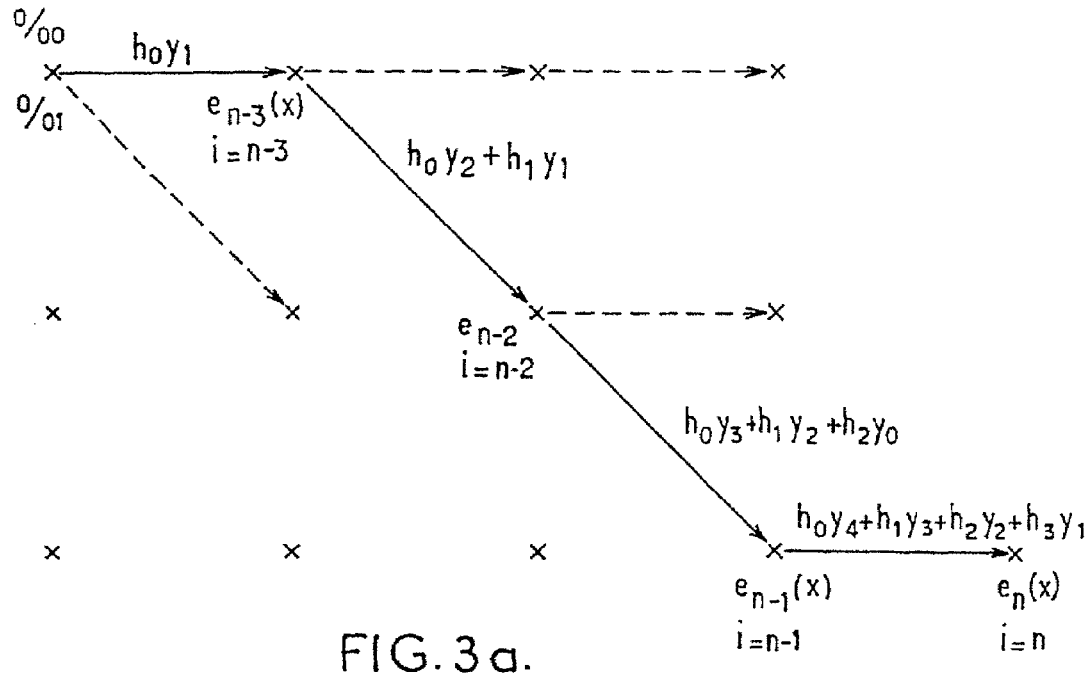
FIG. 3a represents, by way of illustration, a path of the coder trellis, in solid line, and the sequence of symbols $z_n$ corresponding to this path.

By reference to FIG. 3a, it is indicated that, for any current symbol at the output of the channel $z_n$ arising from the multipath transmission, the successive sequence of symbols $y_{n-L}$; $y_{n-L+1}$; $y_{n-1}$; $y_n$ being emitted by the coding process for this above-mentioned sequence of bits, the process of coding/modulation and of transmission corresponds to successive states $e_{n-L}(x)$ $e_{n-L+1}(x)$; ...; $e_{n-1}(x)$ and finally $e_{n(x)}$, these successive states corresponding to branches between successive state nodes as represented in the above-mentioned FIG. 3a.

The estimating of the successive bits $x_n$ in the sense of the maximum likelihood, corresponding to the method which is the subject of the present invention, then leads to seeking the sequence of bits $\{x_n\}$ which minimizes the previously expressed quadratic error.

In accordance with the method, the subject of the present invention, this quadratic error can be expressed by taking account of the preceding relationships in the form of the relationship (3):

$$\varepsilon^2(x) = \sum_n |r_n - g(y_n; y_{n-1}, \ldots, y_{n-L})|^2 \qquad (3)$$

$$= \sum_n \left| r_n - \left\{ \sum_k h_k y_{n-k} \right\} \right|^2$$

With $y_n = f(x_n; e_{n-1}(x))$.
In the foregoing relationship (3), the term $$r_n - \left\{ \sum_k h_k y_{n-k} \right\}$$

can be put in the form:

$$r_n - \{h_0 f(x_n; e_{n-1}(x)) + h_1 f(x_{n-1}; e_{n-2}(x)) + \ldots + h_L f(x_{n-L}; e_{n-L}(x))\}.$$

The term between brackets of the preceding relationship corresponds to the response of the transverse filter representative of the multipath transmission channel subjected to the sequence of symbols following on from the process of coding/modulation over a length L corresponding to the memory of the channel, this sequence of symbols being written $y_{n-L}, y_{n-L+1}, y_{n-1}, y_n$. This sequence is sent out by the coder with $t=n$ under the assumption of a sequence of bits $x=\{xn\}$. Under these conditions, the coder then passes through the states $e_{n-L}(x)$; $e_{n-L+L}(x)$; ...; $e_{n-1}(x)$ so as to arrive finally at the state $e_n(x)$. The current symbol at the output of the channel during the last transition is then equal to $$Z_n = \sum_k h_k y_{n-k}.$$

The relationship (4) below:

$$\left| r_n - \left\{ \sum_{k \geq 0} h_k y_{n-k} \right\} \right|^2 = \left| r_n - h_0 y_n - \left\{ \sum_{k \geq 1} h_k y_{n-k} \right\} \right|^2 \qquad (4)$$

thus defines the branch metric of the last transition $e_{n-1}$ ($x \rightarrow e_n(x)$) and can be calculated in the manner of the DFSE process by ascending the successive states previously visited. This metric depends on the path followed in the trellis in order to arrive at a given state $e_n(x)$.

This method of calculating the metric intrinsically contains the error-propagation problem mentioned above in the description.

For this reason, and with the aim of making the joint decoding and equalization method, the subject of the present invention, robust and effective, the method furthermore consists, at stage 1003 represented in FIG. 2b, in inhibiting, in the course of this ascent, the error-propagation process because of the calculation of the branch metrics, this inhibition being carried out by memory storage, at the level of each node i and at each instant t, of a number of survivors S greater than 1, each survivor being defined by a metric M(i,t,k) for the node i at the instant t for the survivor of ranking k in question. For S survivors, it is recalled that k $\epsilon[1, S-1]$. An update of each survivor is then carried out at the instant t+1 for each node i by calculation of a branch metric and selection of the S best branch metrics from among the set of the 2S possible branch metrics at the node in question.

The stage 1003 described above is then followed by a stage 1004 consisting in determining the final survivor with the smallest metric $M_m (0, \tau, 1)$ and in reading the sequence of corresponding information bits by ascending the state of the successive state nodes.

It will be understood, needless to say, that the method, the subject of the present invention, can then be repeated for any following sequence of bits corresponding to a message transmitted.

A more detailed description of the process of inhibiting the propagation of errors will now be given in connection with FIG. 3b.

Figure 3B:
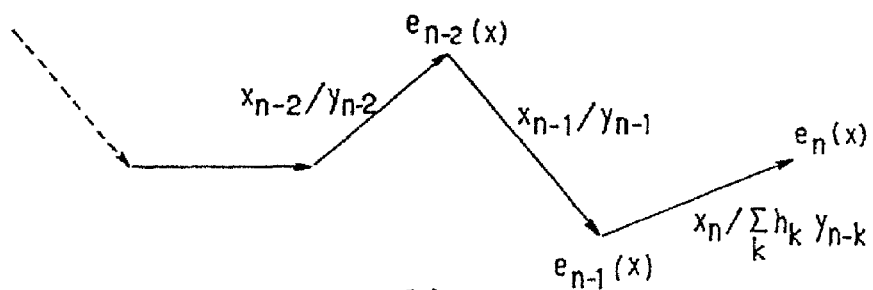

By reference to the above-mentioned FIG. 3b, it is indicated that the error-propagation inhibition process consists in adopting a number S>1 of survivors in each node of ranking i and at each instant t. This is because, if the true path of the trellis, the one which corresponds to the sequence of symbols sent, is not the best one at a given instant, it should not, however, be lost permanently.

By reference to the above-mentioned figure, it is indicated that the current symbol at the output of $$Z_n = \sum_k h_k y_{n-k}.$$

the channel is obtained under the assumption that the state $e_n(x)$ is reached via the succession of states $e_{n-L}(x)$, $e_{n-L+1}(x)$, ..., $e_{n-1}(x)$ as represented in the drawing.

Under the assumption, by way of non–Limiting example, of a trellis arising from a convolutional code of efficiency 1/n, therefore corresponding to a trellis including $N=2^K$ states, two branches thus depart from each node, one corresponding to a 0-value bit at the input of the coder, the other to a 1-value bit at this same input of the coder.

At each node of ranking i and at each instant t, S survivors are stored, each survivor corresponding to a sequence of bits, denoted $S_{i,t,k}$ where i designates the ranking of the node in question, t the corresponding instant and k the ranking of the survivor in question such that $0 \leq k \leq S-1$. Each sequence of bits constituting a survivor is characterized by a length, called accumulated metric of paths, denoted M(i,t,k), that is to say metric of the $k^{th}$ survivor at the node of ranking i at the given instant t. It will be recalled that the notion of metric corresponds to the definition according to which, in the theory of measurement in a given space, the notion of metric is based on the formula of the distance between two points of this space.

Figure 3C:
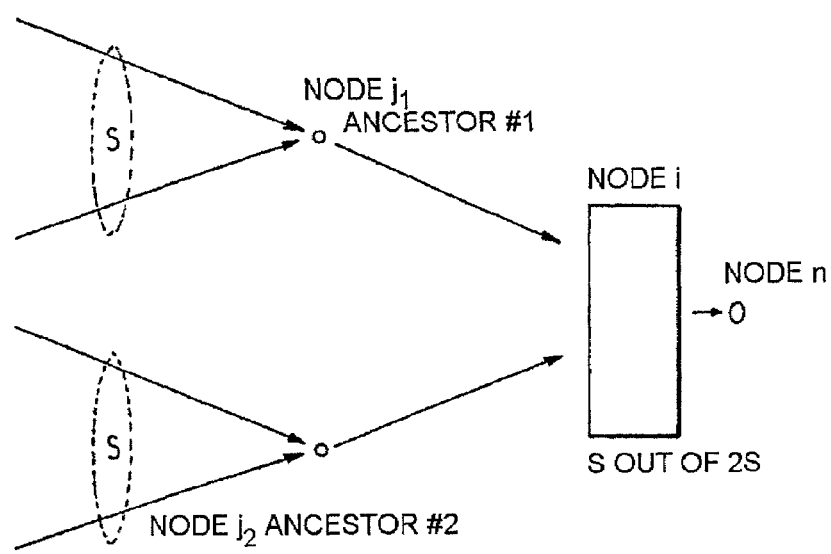

The metric values M (i,t,k) being known at any instant t, their updating at the instant t+1 can be carried out in the manner below, in the case of a code of efficiency 1/n:

any node of ranking i is consecutive on two antecedents or ancestors, as represented in FIG. 3c, $j_1$ and $j_2$, which are determined by their sets of S respective survivors such as $S_{j1,t,k}$ and $S_{j2,t,k}$, with $0 \leq k \leq S-1$ and with respective metrics M ($j_1$,t,k) and M($j_2$,t,k). There therefore exist 2S possible ways of reaching a node of ranking i at the instant t+1 by reason of S possibilities for the ancestor $j_1$ at the instant t and S possibilities for the ancestor $j_2$ at this same instant t, each ancestor being of the form of a survivor at the instant t prolonged by a branch going from $j_1$, $j_2$ respectively, to the node of ranking i.

For each of these 2×S candidates, the metric of the last branch, that is to say that incident on the node of ranking i, is calculated according to the foregoing relationship (4) by ascending the surviving paths in each ancestor $j_1$ and $j_2$. The branch metrics thus obtained are denoted δm(j,i,k) and thus the following quantities are obtained:

$$M(j_1, t, k) + \delta m(j_1, i, k) \text{ for } k = 0, \ldots, S-1$$

$$M(j_2, t, k) + \delta m(j_2, i, k) \text{ with } k = 0, \ldots, S-1.$$

It is thus possible, for the node of ranking i at the instant t+1, to adopt the S best paths from among the 2×S possible, which makes it possible to obtain S survivors for the node of ranking i at the instant t+1.

As regards the implementation of stage 1004, it is indicated that this can be carried out when all the coded symbols of a packet have been received and when the preceding operations have been carried out, it then being possible to determine the final survivor of smallest metric. It is a matter, under this assumption, of the implementation of a Viterbi algorithm according to an extended version, and it is then possible to ascend the best path in order to read the corresponding sequence of information bits via an ascending operation, known by the name of Back Tracking. As regards the number of survivors adopted, it is indicated that S can be taken to be equal to 4, in a non-Limiting way.

A more detailed description of a specific operating mode making it possible to enhance the reliability of the method, the subject of the present invention, will now be given in connection with FIG. 4.

Figure 4:
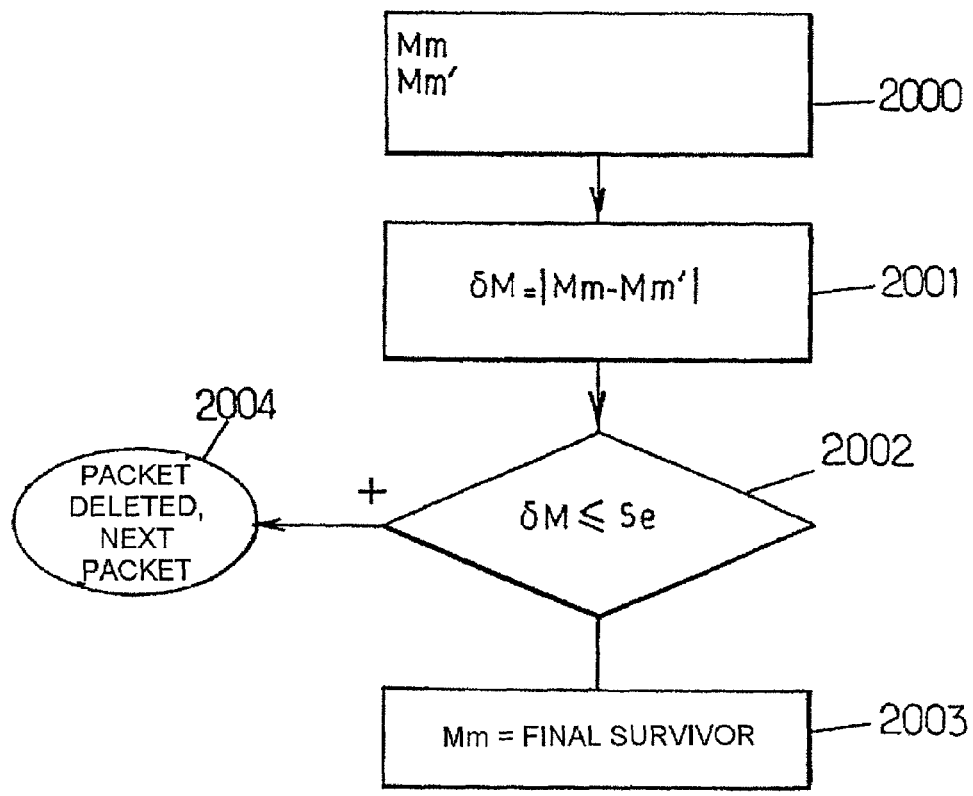
FIG. 4 represents a flow chart of a variant implementation of the method which is the subject of the invention as represented in FIG. 2b.

In FIG. 4 has been represented the above-mentioned specific operating mode, which can consist, at a stage 2000, in determining the second-best survivor with respect to the survivor of smallest metric, the metric of this next-final survivor being denoted $M_{m'}(0, \tau, 1)$, this metric being adjacent to and immediately above the smallest metric mentioned above in the description.

Stage 2000 can then be followed by a stage 2001 consisting in calculating a metric offset, the absolute value in the difference in metrics between the smallest metric and the immediately higher adjacent metric, this metric offset satisfying the relationship:

$$\delta_M = |M_m - M_{m'}|$$

By way of simplification, the metrics have been designated by $M_m$ for the smallest metric and $M_{m'}$ for the adjacent metric immediately above the smallest metric.

The metric offset is then compared, at a test stage 2002, with a threshold value according to the relationship:

$$\delta_M \leq S_e$$

the value of $S_e$ possibly being defined on the basis of experimental results and of conditions of use.

If $\delta_M$ is below the threshold 2002, the best two survivors are too close and choosing between the two is not reliable. The packet is declared to be erased, 2004, since the two decodings on the two paths would have led to different results.

In the opposite case, $\delta_M >$ threshold, the decoding is assumed to be correct and the packet is accepted, 2003.

Simulations have been carried out in order to reveal the performance of the method, the subject of the present invention, described above.

Figure 5A:
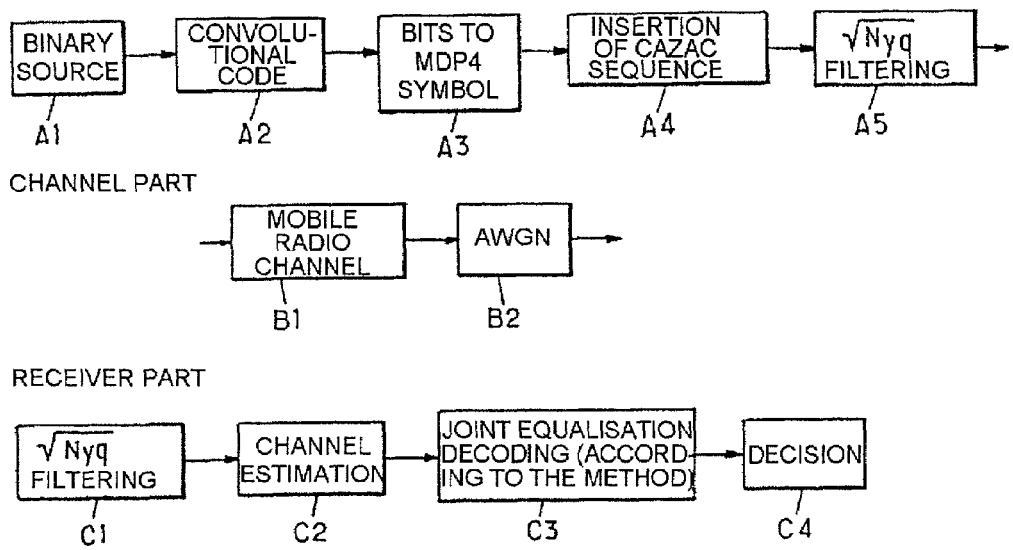
FIG. 5a represents a block diagram of an operating mode used to carry out trials on simulation of implementation of the method which is the subject of the present invention.

In FIG. 5a has been represented the corresponding operating modes in the context of a block diagram for the channel part on the basis of a binary code $A_1$, of a coder introducing a convolutional coding $A_2$, of a channel modulation of MDP4 type, $A_3$, of a known-sequence insertion of CAZAC type, $A_4$, and of a Nyquist-root filtering $A_5$.

As regards the transmission by the multipath radio frequency channel, the latter corresponded to a mobile radio channel $B_1$ followed by the addition of Additive White Gaussian Noise $B_2$.

As regards the reception part, this corresponded to Nyquist-root filtering $C_1$, followed by channel estimation $C_2$ then joint equalization and coding, in accordance with the method which is the subject of the present invention, $C_3$, and a decision $C_4$.

The simulation tests were carried out by virtue of the COSSAP software, marketed by the company SYNOPSYS. The roll-of factor of the Nyquist-root filtering was set at 0.25 and the convolutional code used was a code with constraint-length code of 5, i.e. a trellis of 16 states. The generator polynomials were of the form:

$$G_1(D) = 1 + D^3 + D^4$$

and $$G_2(D) = 1 + D + D^3 + D^4$$

introducing a minimum distance of 7. The modulation chosen at the output from the convolutional code was phase modulation with four states turned by 45° so as to use the CAZAC sequences.

Figure 5B:
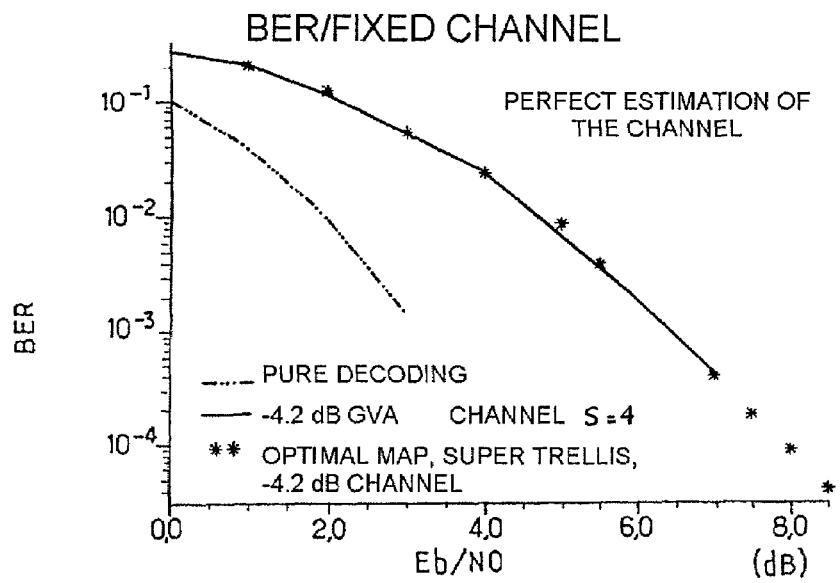
FIGS. 5b and 5c represent various comparative tests of values of packet-error rates obtained by virtue of the implementation of the method which is the subject of the present invention and to an optimal solution by decoding then equalization.

FIG. 5b represents the results of tests with a fixed radio frequency channel, that is to say a channel including filtering coefficients $h_0$, $h_1$, $h_2$ and $h_3$ of fixed value. These coefficients had the values given below in table 1:

TABLE 1

| $h_0$ | $h_1$ | $h_2$ | $h_3$ |
|---|---|---|---|
| 0.38 | 0.60 | 0.60 | 0.38 |

The results, compared with the optimal solution, are represented in FIG. 5b.

In the light of FIG. 5b, it may be noted that, although the method, which is the subject of the present invention, is sub-optimal, it nevertheless gives performance close to the optimal solution for a tolerable complexity, that is to say S=4.

The pure decoding curve, in dots and dashes, corresponds to the performance of the convolutional code chosen in Gaussian noise. The results obtained are represented in solid line for the implementation of the method, the subject of the present invention. The degradation introduced with respect to the case of the pure decoding seems to be less than the value of 4.2 dB and results from the interaction between the trellis of the channel, internal code, and trellis of the coding, external code. The method, the subject of the present invention, makes it possible to obtain a result close to the optimal solution represented in dots in FIG. 5b, the x-axis being graduated in decibels, dB, and the y-axis in bit error rate, BER.

FIGS. 5c to 5h represent the frame error rate FER on the y-axis, with respect to the level in dB on the x-axis. This is because, for systems for the radio or fixed ATM type, only the cell or frame error rate is relevant.

Figure 5C:
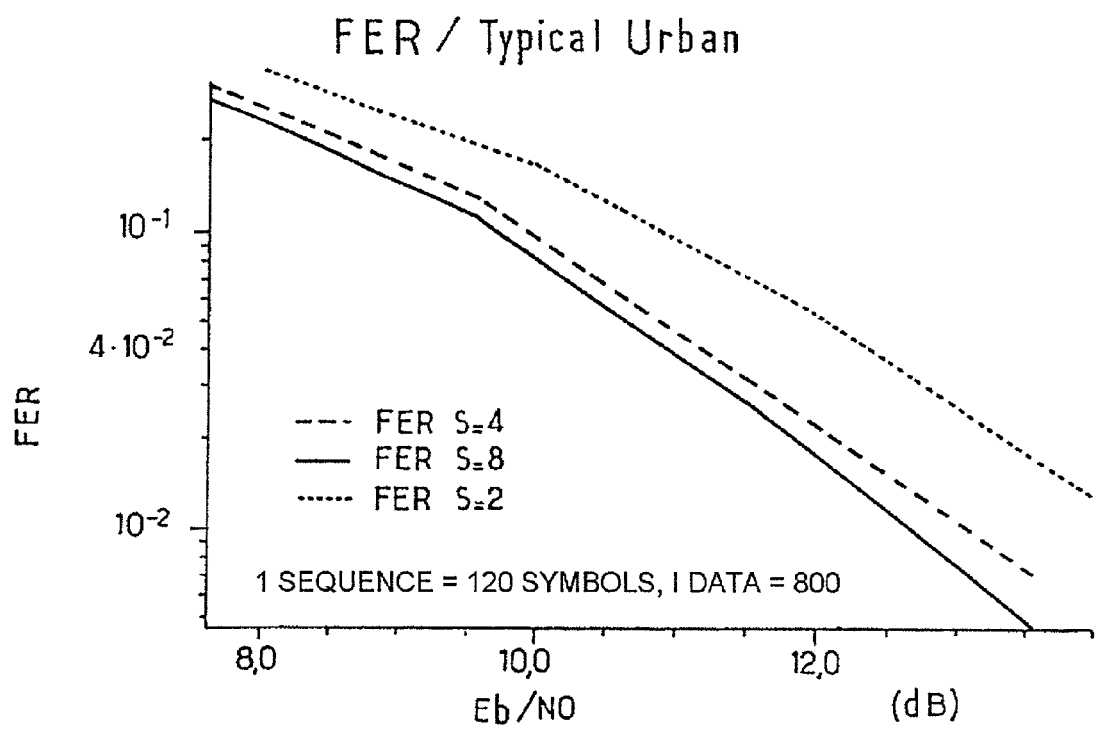

In FIG. 5c has been represented the case of a mobile radio channel of the Typical Urban type of the GSM for a usable throughput at 2 Mbit/s. The coefficients of the filter, which are representative of the radio frequency transmission channel, follow a complex Gaussian distribution, the time-domain variation being given by a normalized Doppler profile. At the throughput of 2 Mbit/s a single radio frequency channel exhibits a great deal of interference between symbols by reason of the high level of the throughput. The channel of Typical Urban type represented in FIG. 5c corresponds to a situation of the urban macrocellular type, for which the throughput at 2 Mbit/s corresponds well to the evolution of mobile services towards multimedia. The values of the filtering coefficients are given in table 2 for the corresponding radio frequency channel:

TABLE 2

| Coefficient number i | Relative time ($\mu$s) | Average power (dB) | Doppler spectrum |
|---|---|---|---|
| 1 | 0.0 | −3.0 | CLASS |
| 2 | 0.2 | 0.0 | CLASS |
| 3 | 0.5 | −2.0 | CLASS |
| 4 | 1.6 | −6.0 | CLASS |
| 5 | 2.3 | −8.0 | CLASS |
| 6 | 5.0 | −10.0 | CLASS |

On inspecting FIG. 5c, it will be noted that the choice of S=4 or S=8, causes no very significant change in performance. Consequently, it can be concluded that the optimum is substantially achieved for S=4.

Simulation trials were also carried out in the context of the BRAN project for a usable throughput equal to 25 Mbit/s, the BRAN (Broadband Radio Access Network) project, corresponding to the European project envisaging the normalizing of high-throughput ATM radio networks within interior-type environments. This project brings together five very severe channel models, that is to say very frequency-selective models, model A, B, C, D and E, for which tests were carried out and plotted on FIGS. 5d to 5h described below. The user throughput of 25 Mbit/s for a 25 MHz band was fixed for an allowable frame-error rate set at $10^{-2}$.

The various types of channels corresponding to the above-mentioned model are more or less easy to equalize on the basis of their fading statistics and of their RMS delay. Model D represented in FIG. 5g is the only one to contain fading of Rice type, this model being easy to equalize. Model E is the most difficult to equalize, since its RMS delay reaches 250 ns and requires a training sequence making it possible to estimate the channel over a duration of close to 50 symbols. The performance here is dependent on the number of survivors S chosen. However, the choice S=4 seems a good performance/complexity compromise for all of the channels.

Figure 5D:
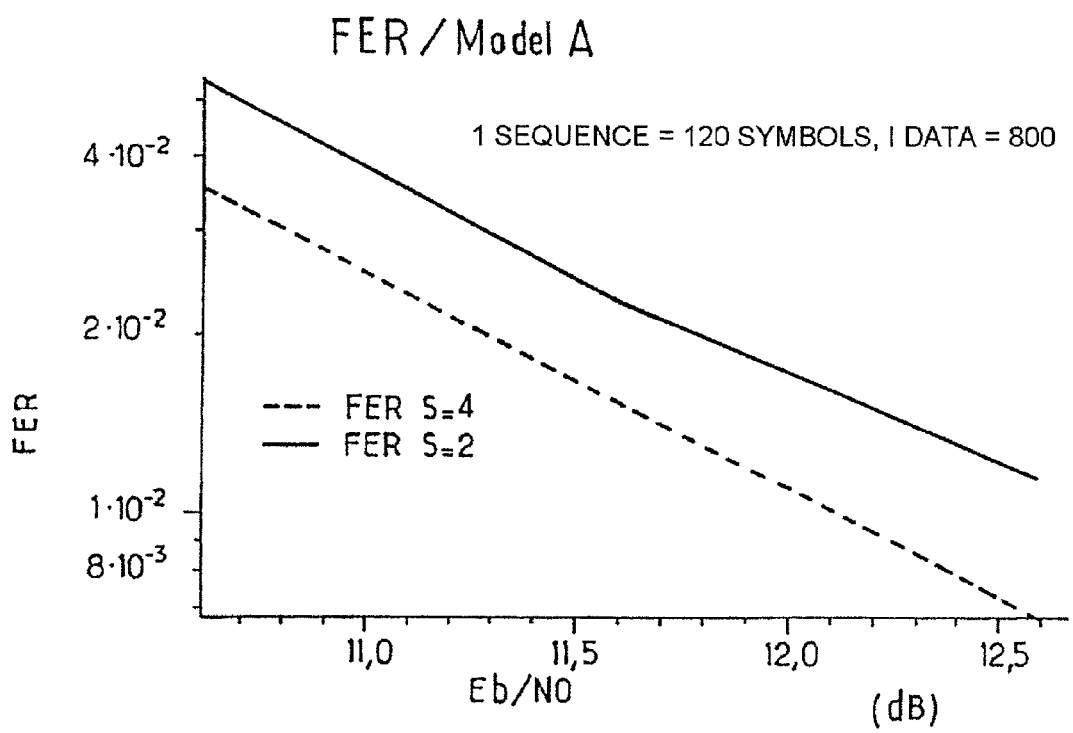
FIGS. 5d through 5h represent frame error rates determined from simulation trials of frequency-selective models A, B, C, D and E, respectively, for envisaging the normalizing of high-throughput ATM radio networks within interior-type environments.
Figure 5E:
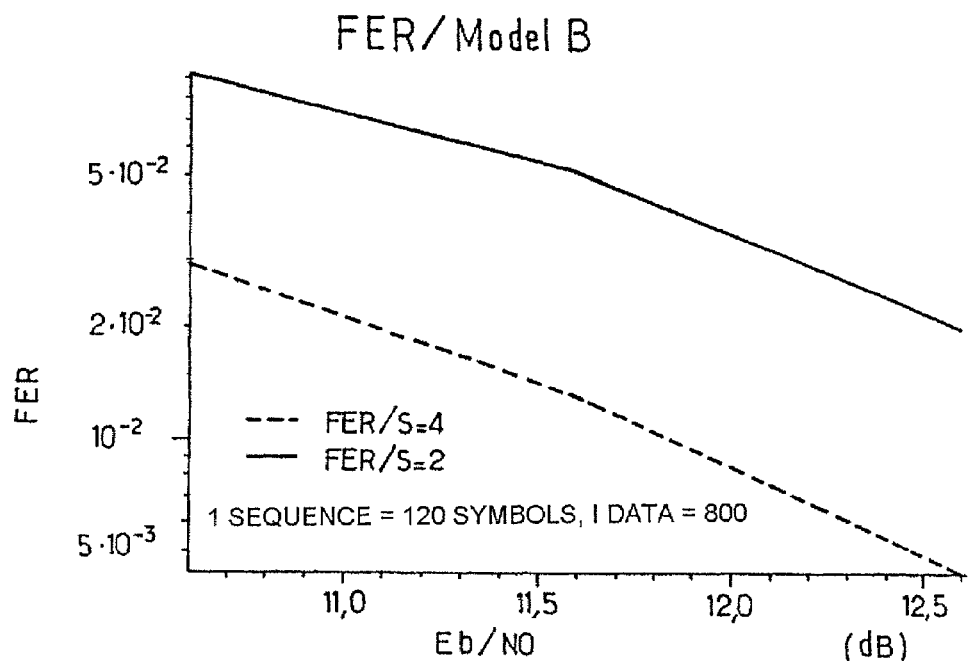
Figure 5F:
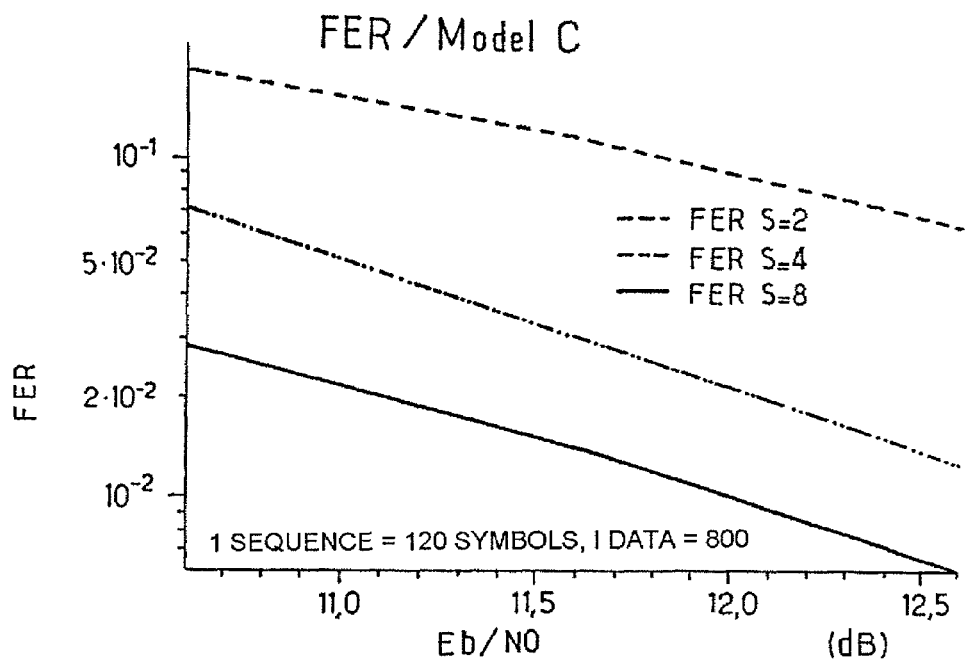
Figure 5G:
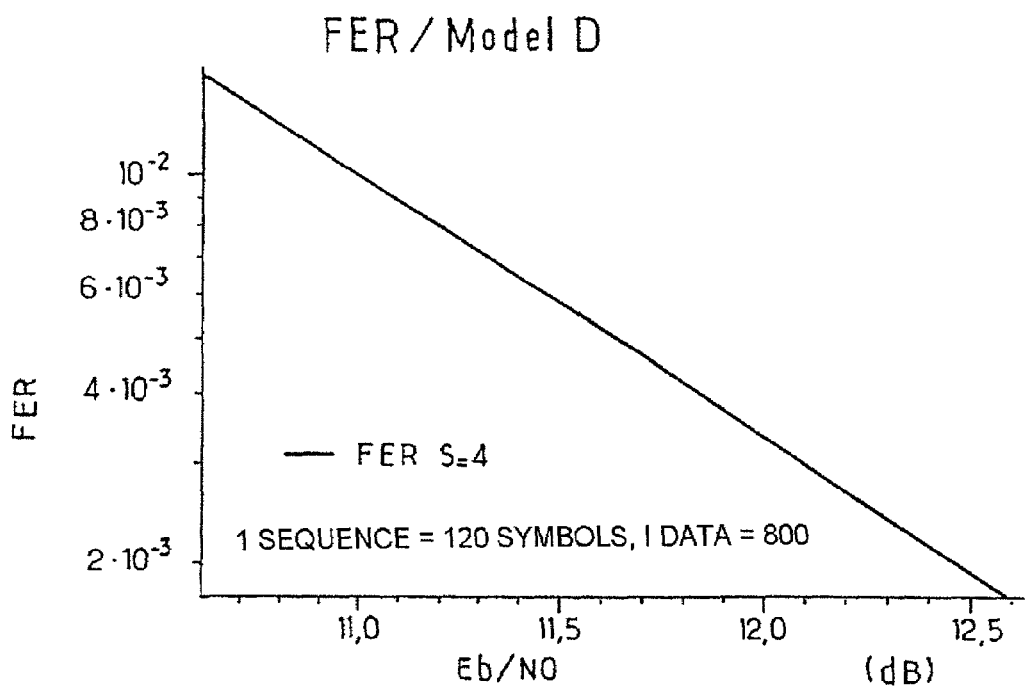
Figure 5H:
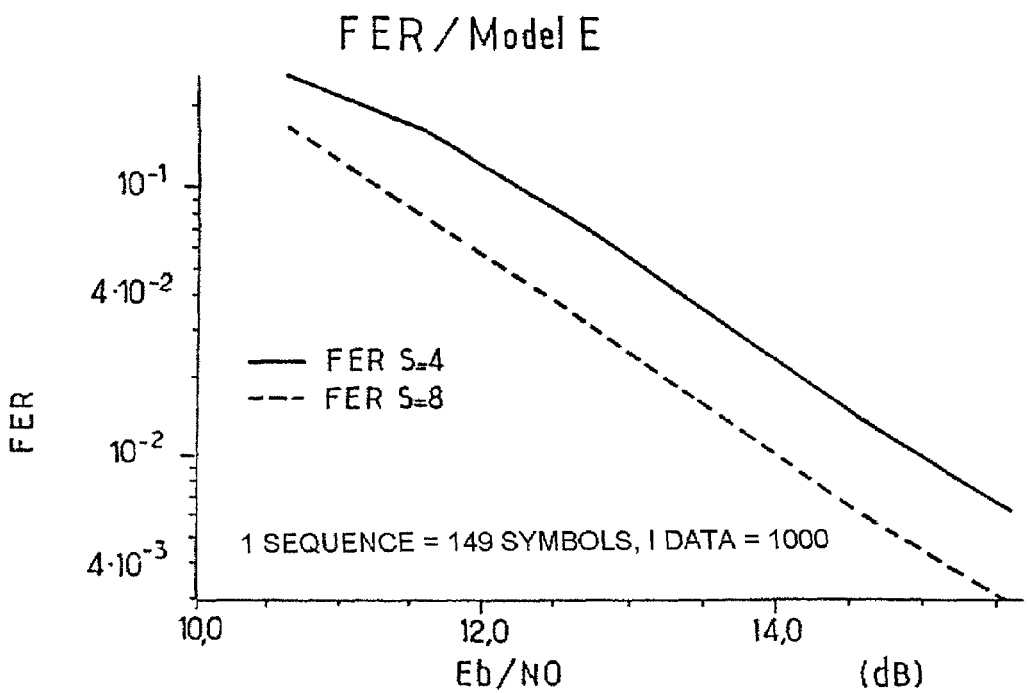

The radio frequency parameters of the A model represented in FIG. 5d are given in table 3 below:

TABLE 3

| Coeff. Number | Delay (ns) | Average power (dB) | Rice factor K | Doppler spectrum |
|---|---|---|---|---|
| 1 | 0 | 0.0 | 0 | CLASS |
| 2 | 10 | −0.9 | 0 | CLASS |
| 3 | 20 | −1.7 | 0 | CLASS |
| 4 | 30 | −2.6 | 0 | CLASS |
| 5 | 40 | −3.5 | 0 | CLASS |
| 6 | 50 | −4.3 | 0 | CLASS |
| 7 | 60 | −5.2 | 0 | CLASS |
| 8 | 70 | −6.1 | 0 | CLASS |
| 9 | 80 | −6.9 | 0 | CLASS |
| 10 | 90 | −7.8 | 0 | CLASS |
| 11 | 110 | −4.7 | 0 | CLASS |
| 12 | 140 | −7.3 | 0 | CLASS |
| 13 | 170 | −9.9 | 0 | CLASS |
| 14 | 200 | −12.5 | 0 | CLASS |
| 15 | 240 | −13.7 | 0 | CLASS |
| 16 | 290 | −18.0 | 0 | CLASS |
| 17 | 340 | −22.4 | 0 | CLASS |
| 18 | 390 | −26.7 | 0 | CLASS |

Those of the B model are given in table 4 below:

TABLE 4

| Coeff. Number | Delay (ns) | Average power (dB) | Rice factor K | Doppler spectrum |
|---|---|---|---|---|
| 1 | 0 | −2.6 | 0 | CLASS |
| 2 | 10 | −3.0 | 0 | CLASS |
| 3 | 20 | −3.5 | 0 | CLASS |
| 4 | 30 | −3.9 | 0 | CLASS |
| 5 | 50 | 0.0 | 0 | CLASS |
| 6 | 80 | −1.3 | 0 | CLASS |
| 7 | 110 | −2.6 | 0 | CLASS |
| 8 | 140 | −3.9 | 0 | CLASS |
| 9 | 180 | −3.4 | 0 | CLASS |
| 10 | 230 | −5.6 | 0 | CLASS |
| 11 | 280 | −7.7 | 0 | CLASS |
| 12 | 330 | −9.9 | 0 | CLASS |
| 13 | 380 | −12.1 | 0 | CLASS |
| 14 | 430 | −14.3 | 0 | CLASS |
| 15 | 490 | −15.4 | 0 | CLASS |
| 16 | 560 | −18.4 | 0 | CLASS |
| 17 | 640 | −20.7 | 0 | CLASS |
| 18 | 730 | −24.6 | 0 | CLASS |

Those of the C model are given in table 5:

TABLE 5

| Coeff. Number | Delay (ns) | Average power (dB) | Rice factor K | Doppler spectrum |
|---|---|---|---|---|
| 1 | 0 | −3.3 | 0 | CLASS |
| 2 | 10 | −3.6 | 0 | CLASS |
| 3 | 20 | −3.9 | 0 | CLASS |

TABLE 5-continued

| Coeff. Number | Delay (ns) | Average power (dB) | Rice factor K | Doppler spectrum |
|---|---|---|---|---|
| 4 | 30 | −4.2 | 0 | CLASS |
| 5 | 50 | 0.0 | 0 | CLASS |
| 6 | 80 | −0.9 | 0 | CLASS |
| 7 | 110 | −1.7 | 0 | CLASS |
| 8 | 140 | −2.6 | 0 | CLASS |
| 9 | 180 | −1.5 | 0 | CLASS |
| 10 | 230 | −3.0 | 0 | CLASS |
| 11 | 280 | −4.4 | 0 | CLASS |
| 12 | 330 | −5.9 | 0 | CLASS |
| 13 | 400 | −5.3 | 0 | CLASS |
| 14 | 490 | −7.9 | 0 | CLASS |
| 15 | 600 | −9.4 | 0 | CLASS |
| 16 | 730 | −13.2 | 0 | CLASS |
| 17 | 880 | −16.3 | 0 | CLASS |
| 18 | 1050 | −21.2 | 0 | CLASS |

Those of the D model are given in table 6 below:

TABLE 6

| Coeff. Number | Delay (ns) | Average power (dB) | Rice factor K | Doppler spectrum |
|---|---|---|---|---|
| 1 | 0 | 0.0 | 10 | CLASS + SPIKE |
| 2 | 10 | −10.0 | 0 | CLASS |
| 3 | 20 | −10.3 | 0 | CLASS |
| 4 | 30 | −10.6 | 0 | CLASS |
| 5 | 50 | −6.4 | 0 | CLASS |
| 6 | 80 | −7.2 | 0 | CLASS |
| 7 | 110 | −8.1 | 0 | CLASS |
| 8 | 140 | −9.0 | 0 | CLASS |
| 9 | 180 | −7.9 | 0 | CLASS |
| 10 | 230 | −9.4 | 0 | CLASS |
| 11 | 280 | −10.8 | 0 | CLASS |
| 12 | 330 | −12.3 | 0 | CLASS |
| 13 | 400 | −11.7 | 0 | CLASS |
| 14 | 490 | −14.3 | 0 | CLASS |
| 15 | 600 | −15.8 | 0 | CLASS |
| 16 | 730 | −19.6 | 0 | CLASS |
| 17 | 880 | −22.7 | 0 | CLASS |
| 18 | 1050 | −27.6 | 0 | CLASS |

Those of the E model are given in table 7 below:

TABLE 7

| Coeff. Number | Delay (ns) | Average power (dB) | Rice factor K | Doppler spectrum |
|---|---|---|---|---|
| 1 | 0 | −4.9 | 0 | CLASS |
| 2 | 10 | −5.1 | 0 | CLASS |
| 3 | 20 | −5.2 | 0 | CLASS |
| 4 | 40 | −0.8 | 0 | CLASS |
| 5 | 70 | −1.3 | 0 | CLASS |
| 6 | 100 | −1.9 | 0 | CLASS |
| 7 | 140 | −0.3 | 0 | CLASS |
| 8 | 190 | −1.2 | 0 | CLASS |
| 9 | 240 | −2.1 | 0 | CLASS |
| 10 | 320 | 0.0 | 0 | CLASS |
| 11 | 430 | −1.9 | 0 | CLASS |
| 12 | 560 | −2.8 | 0 | CLASS |
| 13 | 710 | −5.4 | 0 | CLASS |
| 14 | 880 | −7.3 | 0 | CLASS |
| 15 | 1070 | −10.6 | 0 | CLASS |
| 16 | 1280 | −13.4 | 0 | CLASS |
| 17 | 1510 | −17.4 | 0 | CLASS |
| 18 | 1760 | −20.9 | 0 | CLASS |

The invention claimed is:

1. A method of decoding and of joint equalization of a digital signal protected by a code defined by a trellis, this signal being transmitted on a radio frequency channel according to a transmission with non-interleaved packets, each packet including a known sequence and a sequence of coded data, each sequence of bits $x=\{x_n\}$, from current bit $x_n$, subjected to a coding process defined by a trellis and to a modulation process, having a corresponding sequence of symbols $y=\{y_n\}$, from current symbol $y_n$, satisfying the relationship $y_n=f(x_n; x_{n-1}; \ldots; x_{n-K})$, the sequence of bits prior to the current bit $e_{n-1}(x)=\{x_{n-1}; x_{n-2}; \ldots; x_{n-K}\}$ representing the state of the coding process at the previous state n−1 and the current symbol $y_n$ of the sequence of symbols satisfies the relationship $y_n=f(x_n, e_{n-1}(x))$, the sequence of symbols being submitted to a transverse filtering with finite impulse response, with filtering coefficients $\{h_0; h_1; \ldots; h_L\}$ representative of the radio frequency channel in order to generate a sequence of observed symbols $r=\{r_n\}$, each observed symbol $r_n$ satisfying the relationship $r_n=z_n+b_n$ where $z_n$ designates a current symbol at the output of the channel and $b_n$ a residual noise affecting the channel, each current symbol at the output of the channel $z_n$ satisfying the relationship:

$$Z_n = g(y_n; y_{n-1}; \ldots; y_{n-L})$$
$$= h_0 y_n + h_1 y_{n-1} + \ldots + h_L y_{n-L}$$
$$= \phi(x_n; x_{n-1}; \ldots; x_{n-L-K})$$

this method consisting: in estimating each current bit $x_n$ of the sequence of bits $x=\{x_n\}$ in the sense of the maximum likelihood by minimizing a quadratic error between observed symbol and current symbol at the channel output, where the quadratic error function is $$\varepsilon^2(x) = \sum_n |r_n - z_n|^2 = \sum_n |r_n - \phi(x_n; x_{n-1}; \ldots; x_{n-L-K})^2|,$$

wherein, for any current symbol at the output of the channel $z_n$ arising from the transmission, because of multiple paths, the successive sequence of the symbols $\{y_{n-L}; y_{n-L+1}; y_{n-1}; y_n\}$ arising from the coding process for the sequence of bits $x=\{x_n\}$ corresponding to successive states $e_{n-L}(x); e_{n-L+1}(x); \ldots; e_{n-1}(x)$ and finally $e_n(x)$, corresponding to branches between successive state nodes of a trellis of the code, this method moreover consisting:

in calculating said quadratic error on the basis of the set of observed symbols and of said successive state branches of the coding process, on the basis of said branch metric of the last transition $e_{n-1}(x) \rightarrow e_n(x)$ of the coding process, according to the relationship:

$$\varepsilon^2(x) = \sum_n \left|r_n - \left\{\sum_{k \geq 0} h_k y_{n-k}\right\}\right|^2 = \left|r_n - h_0 y_n - \left\{\sum_{k \geq 1} h_k y_{n-k}\right\}\right|^2$$

said branch metric being calculated by ascending the successive states at the level of each state node over a length equal to the memory of the channel;

in inhibiting, in the course of this ascent, a process of error propagation because of the calculation of said branch metrics, by memory-storage at the level of each node i and at each instant of a number S>1 of survivors, each survivor being defined by an accumulated metric M(i, t,k) for the node i at the instant t for the survivor of ranking k in question, k $\in[0, \ldots, S-1]$, and by an updating of each survivor at the instant t+1 for each node by calculation of a branch metric and selection of the S best branch metrics from among the set of possible branch metrics at the node in question;

in determining the final survivor with the smallest metric, $M_m(0, \tau, 1)$, and in reading the corresponding sequence of information bits, by ascending successive state nodes.

2. The method according to claim 1, wherein it further consists:

in determining a next-final survivor with metric $M_m(0, \tau, 1)$, adjacent to and immediately above the smallest metric, in calculating a metric offset, the absolute value in the difference in metrics between the smallest metric and the immediately higher adjacent metric, $\delta_M = |M_m - M_{m'}|$;

in comparing this metric offset with a threshold value $\delta_M \leq S_e$, this threshold value $S_e$ being defined on the basis of experimental results and of conditions of use;

in rejecting the final survivor when said metric offset satisfies the comparison of being below this threshold value.

\* \* \* \* \*

UNITED STATES PATENT AND TRADEMARK OFFICE
CERTIFICATE OF CORRECTION

| | | |
|---|---|---|
| PATENT NO. | : 7,012,976 B1 | Page 1 of 1 |
| APPLICATION NO. | : 10/070854 | |
| DATED | : March 14, 2006 | |
| INVENTOR(S) | : Patrick Tortelier and Raphaël Visoz | |

It is certified that error appears in the above-identified patent and that said Letters Patent is hereby corrected as shown below:

ON THE TITLE PAGE:

In (86), §371 (c)(1), (2), (4) Date, change "Mar. 8, 2000" to --Mar. 8, 2002--

IN THE CLAIMS:

In Claim 1, Column 14, lines 58-59, add the Σ symbol to the second part of the equation to read as $$-- \varepsilon^2(x) = \sum_n \left| r_n - \left\{ \sum_{k \geq 0} h_k y_{n-k} \right\} \right|^2 = \sum_n \left| r_n - h_0 y_n - \left\{ \sum_{k \geq 1} h_k y_{n-k} \right\} \right|^2 --.$$

In Claim 2, Column 16, line 6, change " $\delta_M = |M_m - M_{m'}|$ " to -- $\delta_M = |M_m - M_{m'}|$ --.

In Claim 2, Column 16, line 8, change "$\delta_M \leq S_e$" to read --$\delta_M \leq S_e$--.

Signed and Sealed this

Tenth Day of October, 2006

JON W. DUDAS
*Director of the United States Patent and Trademark Office*